UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PRODUCTION OF CAOUTCHOUC SUBSTANCES.

1,070,258.     Specification of Letters Patent.     Patented Aug. 12, 1913.

No Drawing.     Application filed August 24, 1910. Serial No. 578,608.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in the Production of Caoutchouc Substances, of which the following is a specification.

We have found that by our method of polymerization the hydrocarbon of the erythrene series known as isoprene or beta-methyl erythrene:

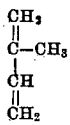

and containing the characteristic nucleus of the erythrene series, graphically represented $C=C-C=C$, can be converted into a caoutchouc substance which may replace natural caoutchouc in its chemical and technical applications.

The process for producing the new caoutchouc substance consists in heating isoprene in an appropriate manner so that our caoutchouc substance is mainly produced. The process may also be carried out in the presence of agents which promote polymerization or which act as diluents.

In order to illustrate our invention the following examples are given, the parts being by weight:—

Example A: 200 parts of isoprene are dissolved in 200 parts of benzene and the resulting solution is heated for 2 days in an autoclave to 120° C. The benzene and the by-products which may have been formed, are distilled over *in vacuo* whereupon our caoutchouc substance in the form of an elastic substance remains behind.

Example B: 200 parts of isoprene are heated in an autoclave for 3 weeks at 70° C. A jelly-like mass is thus obtained, which is heated on the water bath *in vacuo* and is then heated *in vacuo* in an oil bath to 130° C. The caoutchouc substance is then shaken with 10 times its quantity of ether for 24 hours. The ether is poured off and the residue is heated to 30–40° C. *in vacuo.*

Example C: 500 parts of isoprene are heated while stirring in an autoclave to 110° C. for 10 hours together with 50 parts of an aqueous 50 per cent. solution of meta-phosphoric acid. The mixture is then allowed to stand for 8–14 days and the caoutchouc substance is isolated as above described.

Example D: 500 parts of isoprene are heated while stirring in an autoclave to 110° C. for 10 hours together with 5 parts of glacial acetic acid. The mixture is then allowed to stand for 8–14 days and the caoutchouc substance is isolated as above described.

The caoutchouc substance is a white substance the color of which does not change. It swells up with chloroform or benzene to a white hyaline substance from which the liquid can be poured off. It is free from protein substances, which are always contained in the natural caoutchouc and play an important part in it with regard to the elasticity of the natural caoutchouc. It forms ozonids, nitrosites, brom addition products of which the following are the most characteristic: The nitrosite is a yellow powder; the ozonid is a thick oil which is decomposed on being heated. It is insoluble in alcohol and acetone but soluble in coal-tar benzene.

Our method of polymerization may also be applied to mixtures of isoprene and hydrocarbons of the erythrene series and of similar groups in various proportions and the thus formed mixtures of new caoutchouc substances may be employed in the arts.

Our caoutchouc substance described herein may be vulcanized and such vulcanized caoutchouc substance may be used in the same manner as vulcanized natural caoutchouc. They are in the vulcanized form whitish to grayish products which are not adhesive. We can also use a mixture of our caoutchouc substance described herein with any other caoutchouc substance for example with those described in our other application Ser. No. 578,607, filed August 24, 1910, and subject this mixture to vulcanization or we may mix our caoutchouc substance with natural caoutchouc and subject this mixture to vulcanization.

The term caoutchouc-forming conditions is used herein to indicate such conditions as those illustrated in the foregoing examples which result in the formation of a non-volatile caoutchouc-like product insoluble in alcohol and acetone but soluble in benzene and having the properties above indicated as the chief product of the reaction. The temperature of the reaction under such caoutchouc-forming conditions, as illustrated in the foregoing examples, does not exceed 120° C. and should be kept below the temperature of decomposition of the caoutchouc formed as well as below the temperature at which no appreciable amounts of caoutchouc are formed.

We claim:—

1. The process of producing isoprene caoutchouc which comprises heating isoprene under caoutchouc-forming conditions until a caoutchouc-like product is obtained insoluble in alcohol and acetone.

2. The process of producing a caoutchouc-like substance which comprises polymerizing isoprene by heating under pressure and under caoutchouc-forming conditions until a caoutchouc-like product is obtained insoluble in alcohol and acetone.

3. The process of producing a caoutchouc-like substance which comprises polymerizing isoprene by heating in a confined space and under caoutchouc-forming conditions until a caoutchouc-like product is obtained insoluble in alcohol and acetone.

4. The process of producing a caoutchouc-like substance which comprises polymerizing isoprene by heating in the presence of an agent which promotes the polymerization and under caoutchouc-forming conditions until a caoutchouc-like product is obtained insoluble in alcohol and acetone.

5. The process of producing a caoutchouc-like substance which comprises polymerizing isoprene by heating under pressure in the presence of an agent which promotes the polymerization and under caoutchouc-forming conditions until a caoutchouc-like product is obtained insoluble in alcohol and acetone.

6. The process of producing a caoutchouc-like substance which comprises polymerizing a hydrocarbon of the erythrene series and removing volatile constituents from the resulting product by distillation *in vacuo*.

7. The process of producing a caoutchouc-like substance which comprises polymerizing a hydrocarbon of the erythrene series by heating, and separating the caoutchouc-like substance from volatile constituents of the polymerization reaction by distillation *in vacuo*.

8. The process of producing a caoutchouc-like substance which comprises polymerizing isoprene and removing volatile constituents from the resulting product by distillation *in vacuo*.

9. The process of producing a caoutchouc-like substance which comprises polymerizing isoprene by heating, and removing volatile constituents from the resulting product by distillation *in vacuo*.

10. The process of producing a caoutchouc-like substance which comprises adding to an erythrene hydrocarbon a diluent of neutral reaction, and polymerizing such hydrocarbon.

11. The process of producing a caoutchouc-like substance which comprises adding to an erythrene hydrocarbon a diluent of neutral reaction, and polymerizing such hydrocarbon by heating.

12. The process of producing a caoutchouc-like substance which comprises adding to an erythrene hydrocarbon a diluent of neutral reaction, and polymerizing such hydrocarbon by heating under pressure.

13. The process of producing a caoutchouc-like substance which comprises adding to an erythrene hydrocarbon a diluent of neutral reaction, polymerizing such hydrocarbon, and separating the resulting caoutchouc-like product.

14. The process of producing a caoutchouc-like substance which comprises adding to an erythrene hydrocarbon a diluent of neutral reaction, polymerizing such hydrocarbon by heating, and separating the resulting caoutchouc-like substance.

15. The process of producing a caoutchouc-like substance which comprises adding to an erythrene hydrocarbon a diluent of neutral reaction, polymerizing such hydrocarbon by heating, and removing volatile constituents from the resulting product by distillation.

16. The process of producing a caoutchouc-like substance which comprises adding benzene to a hydrocarbon of the erythrene series, and polymerizing such hydrocarbon.

17. The process of producing a caoutchouc-like substance which comprises adding benzene to a hydrocarbon of the erythrene series, and polymerizing such hydrocarbon by heating.

18. The process of producing a caoutchouc-like substance which comprises adding benzene to a hydrocarbon of the erythrene series, polymerizing such hydrocarbon, by heating, and removing volatile constituents from the resulting product by distillation.

19. The process of producing a caoutchouc-like substance which comprises adding benzene to isoprene, and polymerizing the thus diluted isoprene.

20. The process of producing a caoutchouc-like substance which comprises adding benzene to isoprene, and polymerizing the thus diluted isoprene by heating.

21. The process of producing a caoutchouc-like substance which comprises adding benzene to isoprene, polymerizing the thus diluted isoprene by heating, and separating the resulting caoutchouc-like substance.

22. The process of producing a caoutchouc-like substance which comprises adding benzene to isoprene, polymerizing the thus diluted isoprene by heating, and removing volatile constituents from the resulting product by distillation.

23. The process of producing isoprene caoutchouc which comprises heating isoprene at a temperature not exceeding 120° C. until a caoutchouc-like product is obtained insoluble in alcohol and acetone.

24. The process of producing a caoutchouc-like substance which comprises polymerizing isoprene by heating under pressure at a temperature not exceeding 120° C. until a caoutchouc-like product is obtained insoluble in alcohol and acetone.

25. The process of producing a caoutchouc-like substance which comprises polymerizing isoprene by heating in the presence of an agent which promotes the polymerization at a temperature not exceeding 120°C. until a caoutchouc-like product results insoluble in alcohol and acetone.

26. The process of producing a caoutchouc-like substance which comprises adding to an erythrene hydrocarbon a diluent of neutral reaction, and polymerizing such hydrocarbon by heating to a temperature not exceeding 120° C. until a caoutchouc-like product is obtained insoluble in alcohol and acetone.

27. The process of producing a caoutchouc-like substance which comprises adding to isoprene a diluent of neutral reaction and polymerizing the same by heating to a temperature not exceeding 120° C. until a caoutchouc-like product is obtained insoluble in alcohol and acetone.

In testimony whereof we have hereunto set our hands in the presence of two subscribing witnesses.

FRITZ HOFMANN. [L. S.]
CARL COUTELLE. [L. S.]

Witnesses:
CHAS. J. WRIGHT,
ALFRED HENKEL.